(12) United States Patent
Mishra

(10) Patent No.: US 8,989,101 B1
(45) Date of Patent: Mar. 24, 2015

(54) SYSTEMS, METHODS, AND COMPUTER-READABLE MEDIA FOR IDENTIFYING VIRTUAL ACCESS POINTS OF WIRELESS NETWORKS

(71) Applicant: Google Inc., Mountain View, CA (US)

(72) Inventor: Arunesh Mishra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 13/929,400

(22) Filed: Jun. 27, 2013

(51) Int. Cl.
 *H04W 4/00* (2009.01)
 *H04L 12/28* (2006.01)
 *H04W 48/16* (2009.01)

(52) U.S. Cl.
 CPC .................................. *H04W 48/16* (2013.01)
 USPC ......................................... 370/328; 370/252

(58) Field of Classification Search
 USPC .......... 370/252, 277–281, 310–350, 464–465
 See application file for complete search history.

(56) References Cited

U.S. PATENT DOCUMENTS

| | | | |
|---|---|---|---|
| 8,150,367 B1 | 4/2012 | Ji et al. | |
| 8,229,442 B1 | 7/2012 | Ji | |
| 8,472,392 B2 | 6/2013 | Lee et al. | |
| 8,478,280 B1 | 7/2013 | Ji | |
| 2010/0020776 A1 | 1/2010 | Youssef | |
| 2011/0013608 A1 * | 1/2011 | Lee et al. | 370/338 |
| 2012/0135751 A1 | 5/2012 | Mishra | |
| 2012/0195295 A1 * | 8/2012 | Elmaleh | 370/338 |
| 2012/0294231 A1 * | 11/2012 | Finlow-Bates et al. | 370/328 |
| 2013/0044735 A1 | 2/2013 | Lee | |
| 2013/0051303 A1 | 2/2013 | Huang | |
| 2013/0170432 A1 * | 7/2013 | O'Brien et al. | 370/328 |
| 2014/0064257 A1 * | 3/2014 | Fontaine et al. | 370/336 |

FOREIGN PATENT DOCUMENTS

EP 2192811 A1 6/2010

* cited by examiner

*Primary Examiner* — Warner Wong
(74) *Attorney, Agent, or Firm* — Bracewell & Giuliani LLP

(57) ABSTRACT

Systems, methods, and computer-readable media for identifying MAC addresses of a wireless access point (AP) are provided. Two MAC addresses within a spatial proximity are selected from a spatial index of MAC addresses and locations and analyzed based on a signal strength score and a similarity score. If the signal strength score is above a signal strength score threshold, a similarity score between the two MAC addresses is determined. The similarity score is based on the location and relative distance between the selected two MAC addresses, the previously determined signal strength score, and a MAC address similarity metric that determines the heterogeneity between the two MAC addresses. If the similarity score is above a similarity score threshold, the selected two MAC addresses are considered to belong to the same physical AP.

22 Claims, 5 Drawing Sheets

SYSTEMS, METHODS, AND COMPUTER-READABLE MEDIA FOR IDENTIFYING VIRTUAL ACCESS POINTS OF WIRELESS NETWORKS

BACKGROUND OF THE INVENTION

1. Field of the Invention

This invention relates generally to wireless networking and, more particularly, to identifying MAC addresses and virtual access points associated with physical access points.

2. Description of the Related Art

Wireless networks are used for a variety of purposes and by many different devices. For example, computers, smartphones, and other devices may communicate using wireless networks, such as networks implementing the IEEE 802.11 standards (also referred to as Wi-Fi networks). A Wi-Fi network may be broadcast from a wireless access points ("AP") that transmits and receives wireless signals. A wireless access point may connect to or be a part of a network router that processes network communications and addresses. A wireless access point is typically a physical device that may be identified by a media access control address (MAC address) that provides a unique identifier for the physical device. However, for network management and configuration purposes, some access points may have the capability of generating and providing "virtual" MAC addresses that appear as to broadcast from multiple access points. These virtual MAC addresses may interfere with proximity detection and location services for mobile user devices that use detected wireless networks.

SUMMARY OF THE INVENTION

Various embodiments systems, methods, and computer-readable media for identifying MAC addresses of a wireless access point are provided herein. In some embodiments, a computer-implemented method for identifying MAC addresses of a wireless access point is provided. The method includes obtaining, via one or more processors, a plurality of media access control (MAC) addresses and a respective plurality of locations associated with each of the plurality of MAC addresses and selecting, via one or more processors, a first MAC address associated with a first location and a second MAC address associated with a second location from the plurality of MAC addresses based on a proximity between the first location and the second location, wherein the first MAC address and second MAC address were detected in a single measurement. The method further includes determining, via one or more processors, a signal strength score between the first MAC address and the second MAC address and determining, via one or more processors that the signal strength score is above a signal strength score threshold. Additionally, the method includes, in response to determining that the signal strength score is above the signal strength score threshold, determining, via one or more processors, a similarity score between the first MAC address and the second MAC address. The method also includes determining, via one or more processors, that the similarity score is above a similarity score threshold and, in response to determining that the signal strength score is above the signal strength score threshold, identifying, via one or more processors, the first MAC address and second MAC address as belonging to a single wireless access point.

In another embodiment, a non-transitory tangible computer-readable storage medium having executable computer code stored thereon for identifying MAC addresses of a wireless access point is provided. The code includes a set of instructions that causes one or more processors to perform the following: obtaining, via one or more processors, a plurality of media access control (MAC) addresses and a respective plurality of locations associated with each of the plurality of MAC addresses and selecting, via one or more processors, a first MAC address associated with a first location and a second MAC address associated with a second location from the plurality of MAC addresses based on a proximity between the first location and the second location, wherein the first MAC address and second MAC address were detected in a single measurement. The code further includes a set of instructions that causes one or more processors to perform the following: determining, via one or more processors, a signal strength score between the first MAC address and the second MAC address and determining, via one or more processors that the signal strength score is above a signal strength score threshold. Additionally, the code also includes a set of instructions that causes one or more processors to perform the following: in response to determining that the signal strength score is above the signal strength score threshold, determining, via one or more processors, a similarity score between the first MAC address and the second MAC address. Additionally, the code includes a set of instructions that causes one or more processors to perform the following: determining, via one or more processors, that the similarity score is above a similarity score threshold and, in response to determining that the signal strength score is above the signal strength score threshold, identifying, via one or more processors, the first MAC address and second MAC address as belonging to a single wireless access point.

In another embodiment, a system for identifying MAC addresses of a wireless access point is provided. The system includes one or more processors and a non-transitory tangible computer-readable memory having executable computer code stored thereon for identifying MAC addresses of a wireless access point. The code includes a set of instructions that causes one or more processors to perform the following: obtaining, via one or more processors, a plurality of media access control (MAC) addresses and a respective plurality of locations associated with each of the plurality of MAC addresses and selecting, via one or more processors, a first MAC address associated with a first location and a second MAC address associated with a second location from the plurality of MAC addresses based on a proximity between the first location and the second location, wherein the first MAC address and second MAC address were detected in a single measurement. The code further includes a set of instructions that causes one or more processors to perform the following: determining, via one or more processors, a signal strength score between the first MAC address and the second MAC address and determining, via one or more processors that the signal strength score is above a signal strength score threshold. Additionally, the code also includes a set of instructions that causes one or more processors to perform the following: in response to determining that the signal strength score is above the signal strength score threshold, determining, via one or more processors, a similarity score between the first MAC address and the second MAC address. Additionally, the code includes a set of instructions that causes one or more processors to perform the following: determining, via one or more processors, that the similarity score is above a similarity score threshold and, in response to determining that the signal strength score is above the signal strength score threshold, identifying, via one or more processors, the first MAC address and second MAC address as belonging to a single wireless access point.

Figure 1:
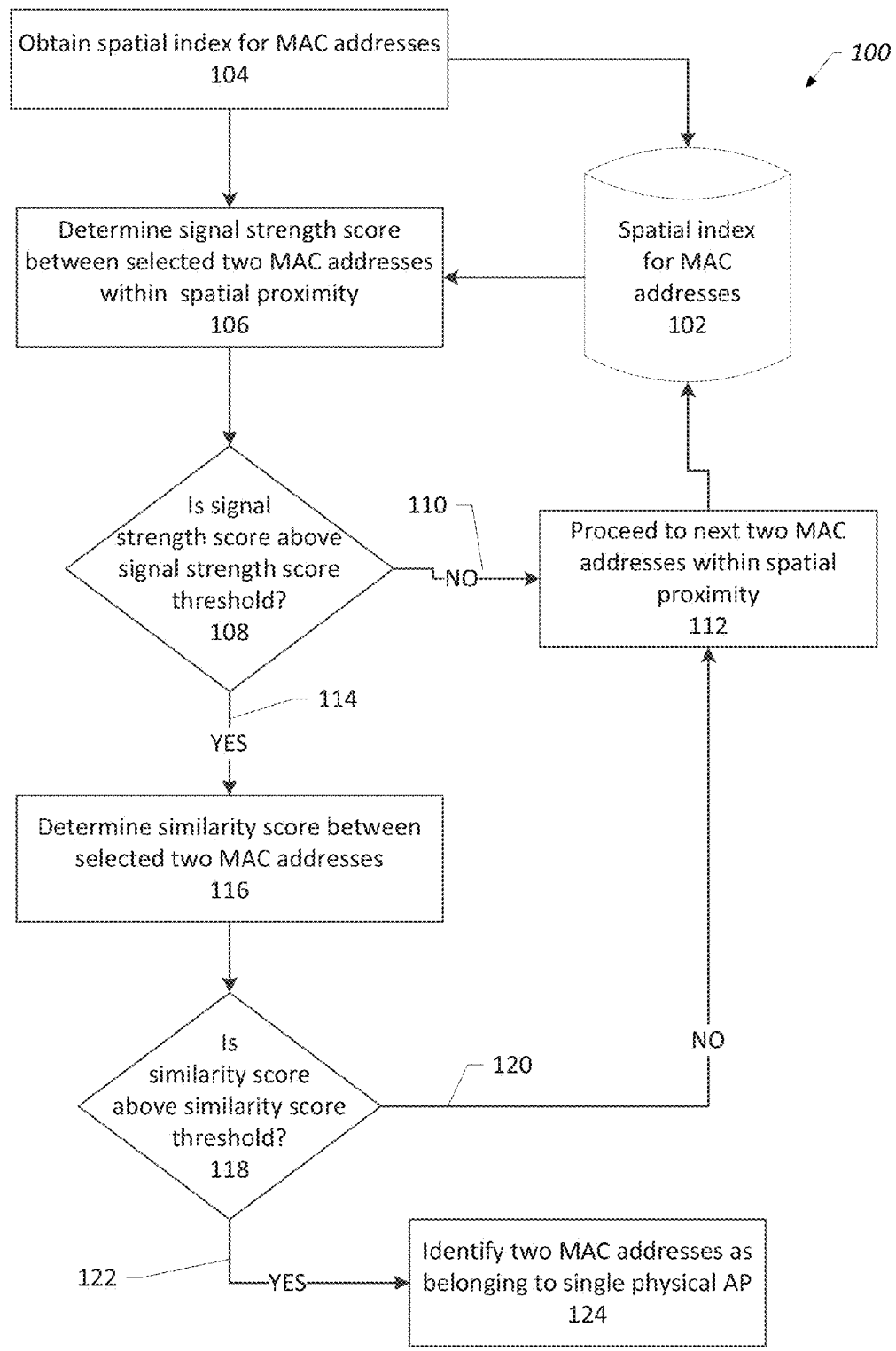
FIG. 1 is block diagram of a process for identifying MAC addresses of a wireless access point in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for identifying MAC addresses of a wireless access point (AP). A single physical AP may generate and broadcast multiple MAC addresses, such as one or more virtual MAC addresses of virtual APs created by the single physical AP. A spatial index stores MAC addresses, associated locations, and signal strengths collected from mobile user devices. Two MAC addresses within a spatial proximity are selected from the spatial index and analyzed based on a signal strength score and a similarity score. The signal strength score between the selected two MAC addresses is determined and is based on the strength of wireless signals associated with a single measurement (e.g., a single scan that detected the MAC addresses) and the frequency of detection of one MAC addresses without detection of the other MAC address. If the signal strength score is above a signal strength score threshold, a similarity score between the two MAC addresses is determined. If the signal strength score is below the signal strength score threshold, the selected two MAC addresses are not considered to belong to the same physical AP and the next two MAC address are selected from the spatial index. The similarity score is based on the location and relative distance between the selected two MAC addresses, the previously determined signal strength score, and a MAC address similarity metric that determines the heterogeneity between the two MAC addresses. If the similarity score is above a similarity score threshold, the selected two MAC addresses are considered to belong to the same physical AP. The selected two MAC addresses are associated with an index for the single physical AP and stored in a data structure of known MAC addresses. If the similarity score is below the similarity score threshold, the selected two MAC addresses are not considered to belong to the same physical AP and the next two MAC address are selected from the spatial index.

FIG. 1 depicts a process 100 for identifying MAC addresses of a wireless access point in accordance with an embodiment of the present invention. Initially a spatial index 102 for MAC addresses is obtained (block 104). The spatial index 102 maps a MAC address to a location (e.g., via location coordinates or other location identifiers) and supports location-based range queries. As used herein, the term location may refer to a specific point or a location range. In some embodiments, the spatial index 102 is generated from wireless network data collected from user devices. For example, mobile user devices that detect a signal from an AP may send the detected MAC address and a location to a server for inclusion in the spatial index 102. Over a period of time, a number of MAC addresses, associated locations, and signal strengths may be collected and included in the spatial index 102. In other embodiments, other data structures having MAC addresses and associated locations may be used to provide MAC address and location data.

Next, a signal strength score between a selected two MAC addresses from the spatial index 102 that are within a spatial proximity and observed in the same measurement (e.g., scan) is determined (block 106). The spatial proximity is determined from the location associated with each selected MAC address in the spatial index 102. In some embodiments, the spatial proximity is a distance between two locations. In such embodiments, the distance may be 0.5 m or greater, 1 m or greater, 2 m or greater, 3 m or greater, 4 m or greater, 5 m or greater, or any other suitable distance. The signals strengths used for the signal strength score are based on observation points for the signal strengths of each MAC address that have a spatial and temporal coherence of a specific magnitude. For example, in some embodiments the selected MAC address and signal strengths are selected based on observation signal strengths are obtained in a single measurement (e.g., scan) of MAC addresses within a spatial proximity. Additionally, in some embodiments the signal strength score is also based in part on the number or frequency of detections in which one of the selected MAC addresses was detected while the other was not. Next, the signal strength score is compared to a signal strength score threshold (decision block 108). If the signal strength score is below the first threshold (line 110), the next pair of MAC addresses from the spatial index is processed (block 112), i.e., the selected two MAC addresses are not considered to belong to the same physical AP.

If the signal strength score is above the first threshold (line 114), a similarity score between the selected two MAC addresses is determined (block 116). The similarity score is based on the following factors: the location and relative distance between the selected two MAC addresses, the previously determined signal strength score, and a MAC address similarity metric that determines the heterogeneity between the two MAC addresses. As will be appreciated, a MAC address is typically a 6-byte address having a first 3 bytes for an Organizationally Unique Identifier (OUI) and a second 3 bytes that are specific to the network device. Thus, the MAC address similarity metric is increased if the selected two MAC address have the same OUI, i.e., if the first 3 bytes (the first octet, second octet, and third octet) are the same. Additionally, the MAC address similarity metric is increased if the difference between the second 3 bytes (the fourth octet, fifth octet, and sixth octet) is below a threshold. For example, the difference between each fourth octet, fifth octet, and sixth octet of each the two MAC addresses may be determined and compared to a threshold. In some embodiments, the threshold is 3 bits or less, 4 bits or less, 5 bits or less, or other suitable threshold.

The similarity score is then compared to a similarity score threshold (block 118). If the similarity score is below the similarity score threshold (line 120), the next pair of MAC addresses from the spatial index 102 is processed (block 112), i.e., the selected two MAC addresses are not considered to belong to the same physical AP. If the similarity score is above the similarity score threshold (line 122), the two MAC addresses are identified as belonging to a single physical AP (block 124). e.g., one or both of the selected two MAC addresses are virtual MAC addresses of virtual AP's created by a single physical AP.

Figure 2:
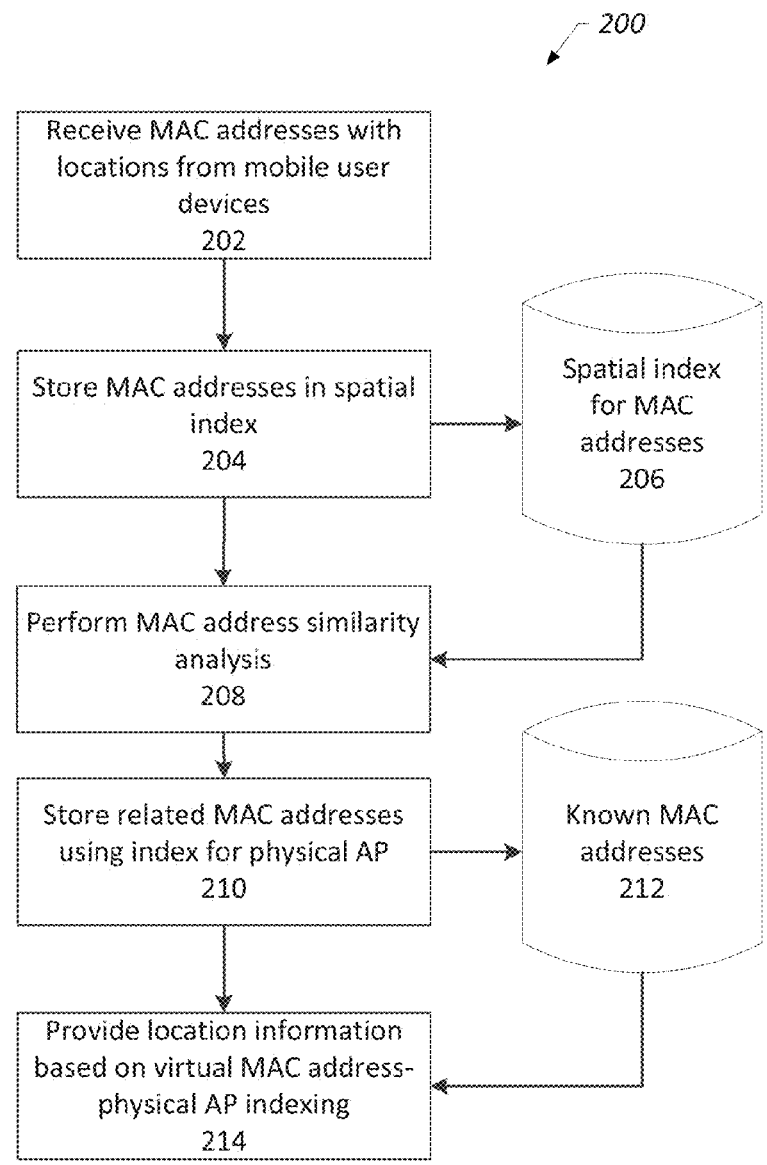
FIG. 2 is a block diagram of a process for obtaining and using MAC addresses in accordance with an embodiment of the present invention.

FIG. 2 depicts a process 200 for obtaining and using MAC addresses in accordance with an embodiment of the present invention. Initially MAC addresses and locations are received from mobile user devices (block 202). As described above, a mobile user device may detect a MAC address and determine or have access to the present location of the mobile user device. In some embodiments, for example, a mobile user device may determine its location using a satellite based positioning system (e.g., the Global Positioning System). The mobile user device may send detected MAC addresses, locations, and signal strengths to a remote server via a network. As discussed above, in some embodiments the MAC addresses are detected in a single measurement (e.g., scan) of Wi-Fi signals near a mobile user device. Thus, in such embodiments, the MAC addresses and detected information are indicated as being detected in a single measurement. The received MAC addresses are stored in a spatial index 206 (block 204). As mentioned above, the spatial index 206 maps a MAC address to a location (e.g., via location coordinates or other location identifiers) and supports location-based range queries. It should be appreciated that locations for a MAC address may be received from multiple mobile user devices, and multiple MAC addresses, locations, signal strengths may be collected over a time period.

Next, a MAC address similarity analysis, such as that described above and illustrated in FIG. 1, is performed on the MAC addresses in the spatial index 206 (block 208). As described above, two MAC addresses within a spatial proximity are analyzed using a signal strength score and a similarity score to determine if the two MAC addresses are related and, thus, belong to a single physical AP. As noted above, each unique pair of two MAC addresses in the spatial index 206 and within a spatial proximity are analyzed. After the analysis, related MAC addresses that belong to a single physical AP are associated with an index for the physical AP and stored (block 210), such as in data structure 212 of known MAC addresses. In some embodiments, the index for the physical AP may be the MAC address of the physical AP. It should be appreciated that two, three, four or more MAC address may be associated with a physical AP. The data structure 212 of known MAC addresses may be used in further processing. For example, location information for a virtual MAC address may be provided based on the indexed physical AP for the MAC address (block 214). Thus, if a mobile user device detects a signal originating from a virtual MAC address, the data structure 212 enables determination of the location of the mobile user device based on the location of the single physical AP associated with the virtual MAC address (via the index in the data structure).

Figure 3:
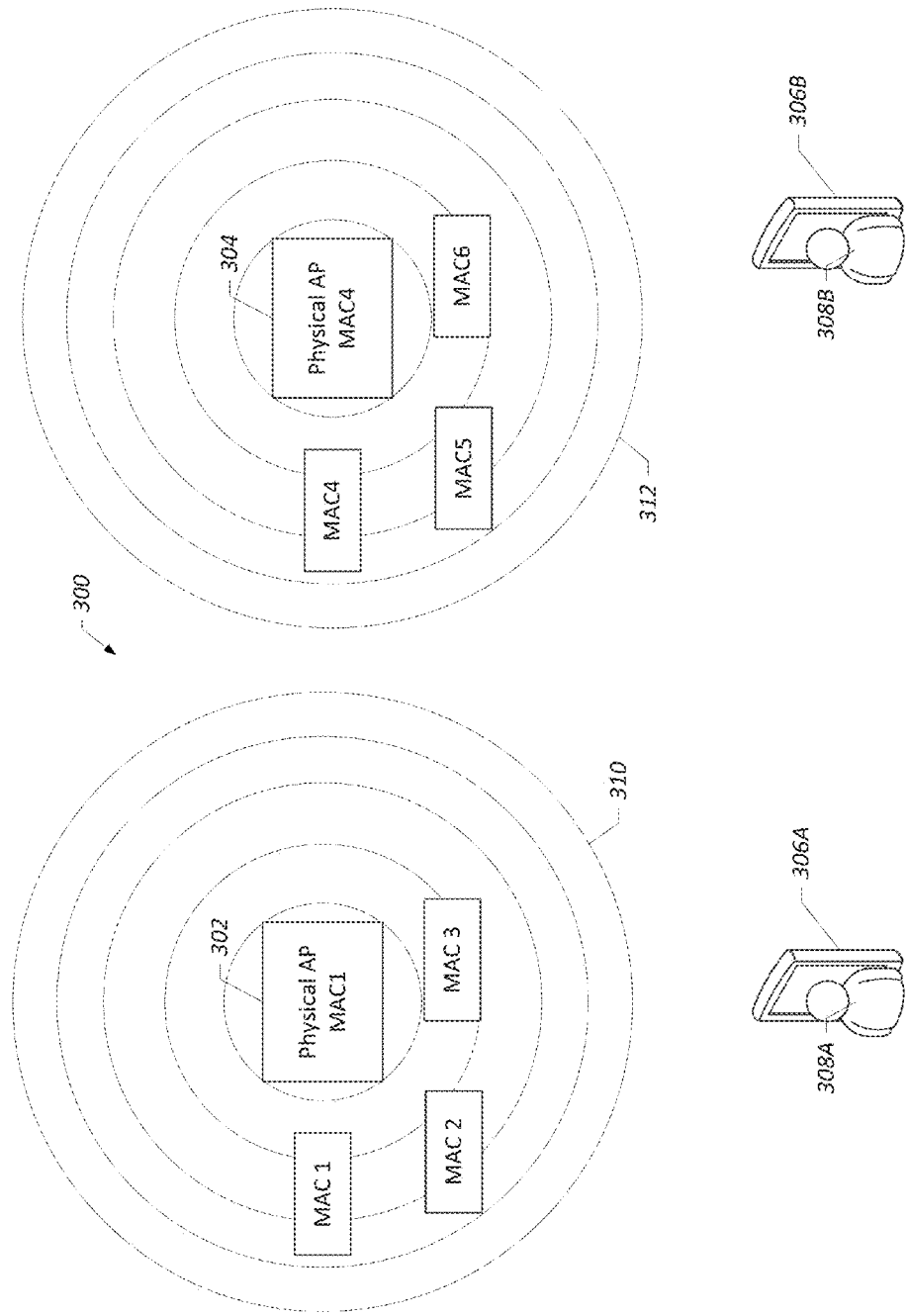
FIG. 3 is a block diagram of a system depicting the detection of virtual MAC addresses by mobile user devices in accordance with an embodiment of the present invention.

FIG. 3 depicts a system 300 depicting the detection of virtual MAC addresses by mobile user devices in accordance with an embodiment of the present invention. As shown in FIG. 3, a first physical AP 302 having a MAC address MAC1 and a second physical AP 304 having a MAC address MAC 5 may broadcast wireless signals in a vicinity of each AP. Such wireless signals may be detected by mobile users 306 of users 308. For example, as shown in FIG. 3, the physical access point 302 may broadcast wireless signals 310 that include frames having the MAC address MAC1, and the physical access point 304 may broadcast wireless signals 312 that include frames originating from the MAC address MAC4.

Additionally, as described above, the physical AP's may have the capability of providing virtual AP's via virtual MAC addresses, i.e., additional MAC addresses generated by the AP. For example, the physical AP 302 may generate virtual AP's having additional MAC addresses MAC2 and MAC3. As shown in FIG. 3, these MAC address may also be used to originate frames broadcast in wireless signals 310 by the physical access point 302. It should be appreciated that the wireless signals 310 may include different wireless signals that each broadcast frames originating from different MAC addresses, i.e., frames that appear to originate from the physical AP 302 and originate from the virtual AP's having the MAC addresses MAC 5 and MAC6. Similarly, for example, the second physical AP 304 may generate additional MAC addresses MAC4 and MAC6. As shown in FIG. 3, the MAC address MAC4 and MAC6 may also be used to originate frames broadcast in wireless signals 312 by the physical access point 304. Herein again, it should be appreciated that the wireless signals 312 may include different wireless signals that each broadcast frames originating different MAC address, i.e., frames that appear to originate from the physical AP 304 and originate from virtual AP's having the MAC addresses MAC 5 and MAC6.

Figure 4:
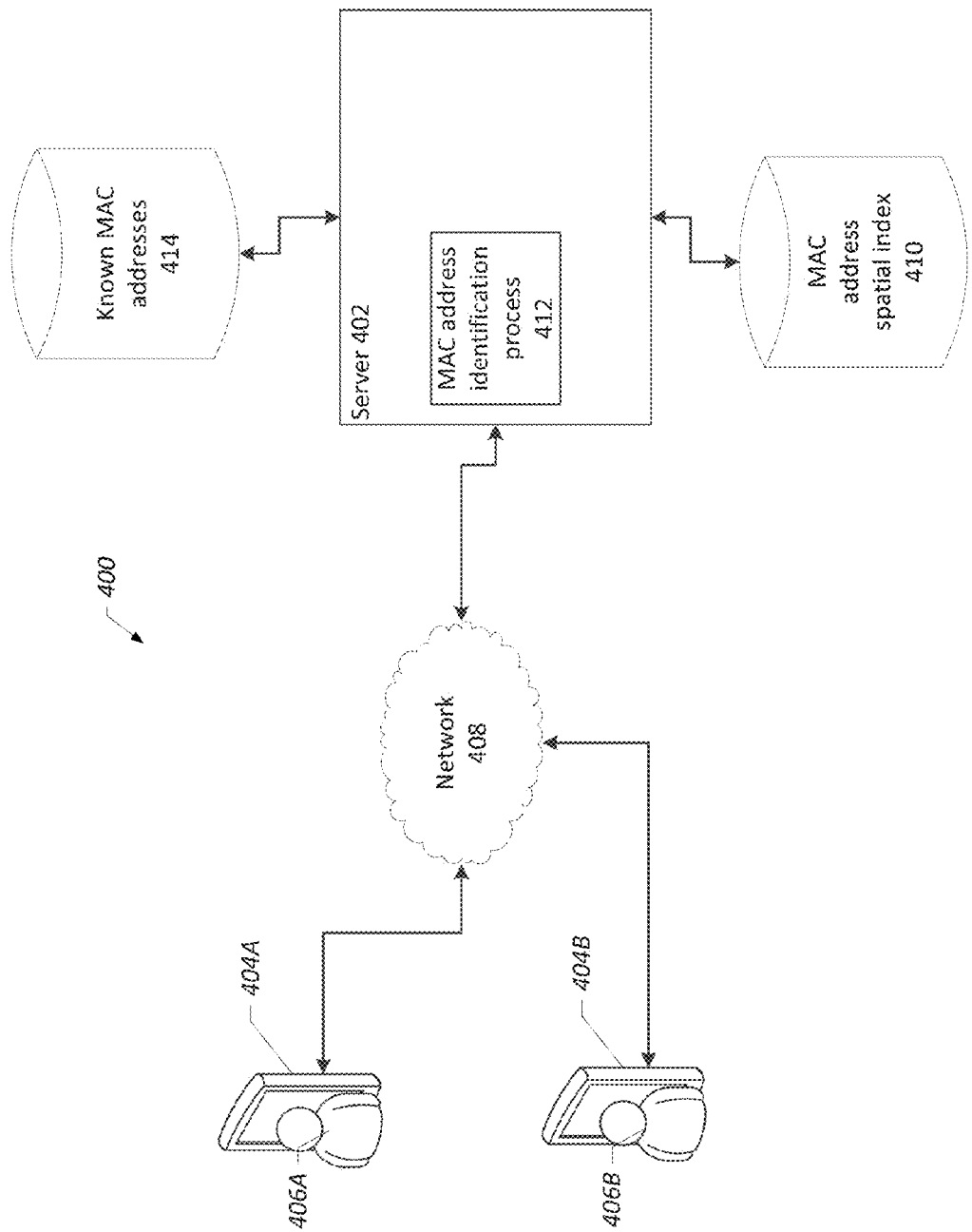
FIG. 4 is a block diagram of a system for identifying MAC addresses of a wireless access point in accordance with an embodiment of the present invention.

FIG. 4 depicts a system 400 for identifying virtual access points of wireless networks in accordance with an embodiment of the present invention. As shown in FIG. 4, the system includes a server 402 and mobile user devices 404 of users 406. The server 402 and mobile user devices 404 are in communication with a network 408. The mobile user devices 404 may include laptop computers, tablet computers, smartphones, personal digital assistants, etc., and may include a receiver for a satellite-based positioning system, such as a Global Positioning System (GPS) receiver. The mobile user devices 404 may also be capable of determining a location via other positioning data, such as Wi-Fi location data, cellular tower multilateration, and other data. Additionally, a user 406 may use the mobile user device 404 to perform search queries and receive search results that are based in part on the location of the mobile user device 404.

As mentioned above, the mobile user devices 404 and server 402 are in communication with the network 408, such as through a wireless network interface. In some embodiments, the network 408 may include multiple networks, and may include any suitable network and networking technology, such as the Internet, an intranet, a local area network (LAN), a wide area network (WAN), or any other suitable network. Additionally, the network 408 may include a wired network, a wireless network, or both. Moreover, it should be appreciated that the mobile user devices 404 and server 402 may communicate over different networks separately and simultaneously. For example, the mobile user devices 404 may communicate over both a wireless Ethernet network and a cellular network. Additionally, other components of the system 400 may communicate over the network 408 or different networks.

The server 402 may be a single server (in a discrete hardware component or as a virtual server) or multiple servers. The server 402 may include web servers, application servers, or other types of servers. Additionally, the server 402 may be, for example, computers arranged in any physical and virtual configuration, such as computers in one or more data processing centers, a distributed computing environment, or other configuration. Such configurations may use the network 408 for communication or may communicate over other networks.

As described above, the mobile user devices 404 may detect wireless networks within a vicinity of the devices and send a MAC address of a detected wireless network, a location, and a signal strength to the server 402. For example, the mobile user device 404A may detect a wireless networks and MAC addresses and send the MAC addresses, locations, and signal strengths, to the server 402. The MAC addresses and associated information may be detected in a single measurement performed by the mobile user device 404A and stored accordingly by the server 402. Similarly, the mobile user device 404B may detect wireless networks and MAC addresses and send the MAC addresses, locations, and signal strengths to the server 402. Here again, in some embodiments the MAC addresses and associated information may be detected in a single measurement performed by the mobile user device 404B and stored accordingly by the server 402. In some embodiments, additional information about a wireless network may be sent to the server 402. As mentioned over, the server 402 may receive MAC addresses, locations, and signal strengths from any number of mobile user devices over a period of time. Moreover, the MAC addresses and locations are not associated with individual user identities or user devices. Additionally, in some embodiments, the MAC address and associated data may not be collected unless a user has expressly provided permission after receiving notice of the collection of such data and how it is used. Further, any additional information associated with an AP, such as service set identification (SSID), basic service set identification (BSSID), IP address, and other information may not be collected or stored.

The server 402 includes or has access to a MAC address spatial index 410 that maps a MAC address to a location (e.g., via location coordinates or other location identifiers) and supports location-based range queries. The MAC address spatial index 410 may be stored using any suitable data structure, such as a database or other data structure. The server 402 includes a MAC address identification process 412 that identifies virtual MAC addresses from the MAC address spatial index 410 according to the techniques described above. The virtual AP identification process may thus select two MAC addresses from the MAC address spatial index 410 that are within a spatial proximity and detected in a single measurement and determine, based on a signal strength score and a similarity score, if the selected two MAC addresses belong to the same physical AP. The server 402 also includes or has access to known MAC addresses 414 that include MAC addresses identified as belonging to the same physical AP. For example, after determining that a selected two MAC address from the spatial index 410 belong to the same physical AP, the selected two MAC addresses may be stored in the known MAC addresses 414 and associated with an index for the physical AP. The known MAC addresses 414 may be stored using any suitable data structure, such as a database or other data structure.

Figure 5:
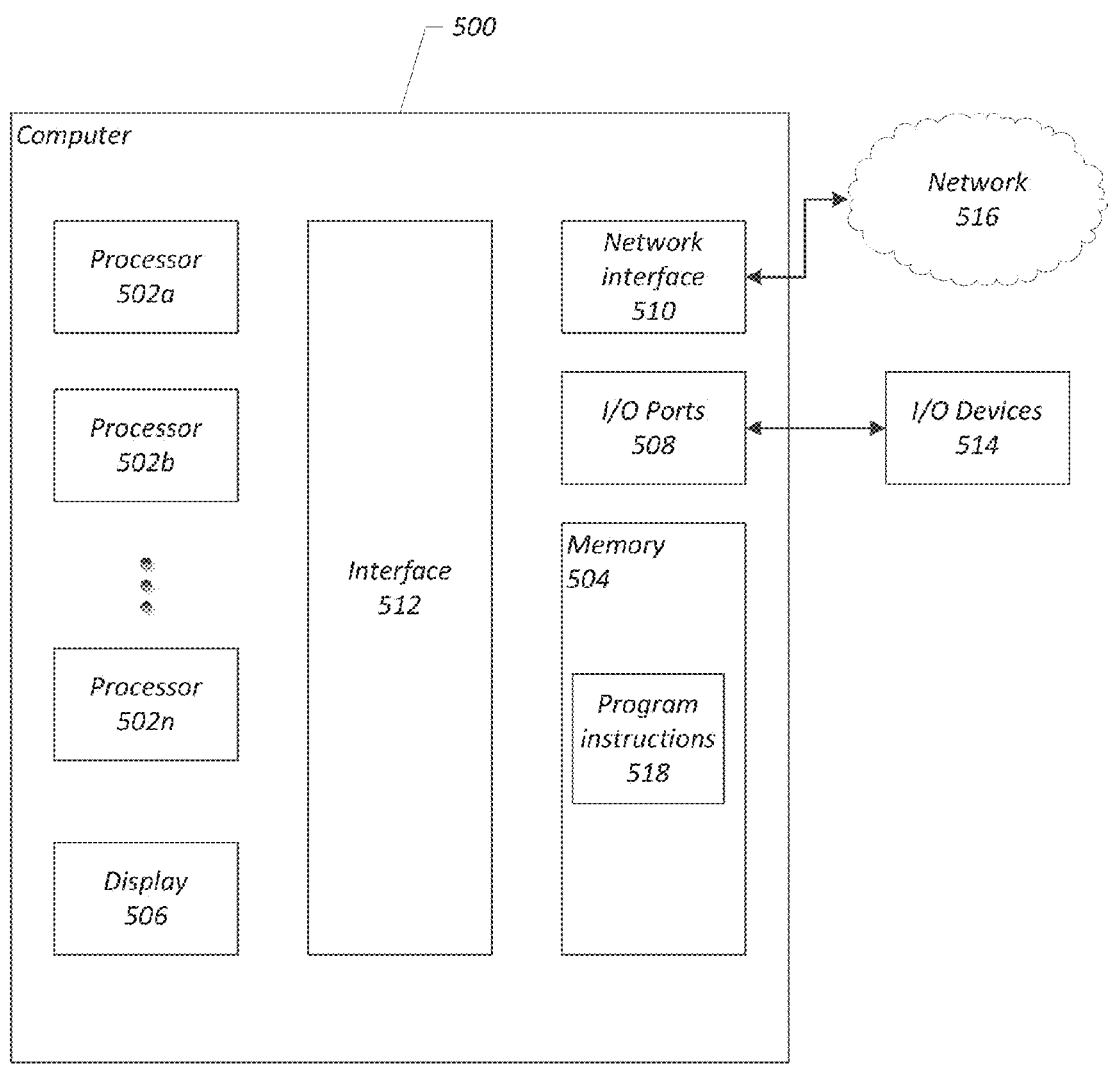
FIG. 5 is a block diagram of a computer in accordance with an embodiment of the present invention.

FIG. 5 depicts a computer 500 in accordance with an embodiment of the present invention. Various portions or sections of systems and methods described herein include or are executed on one or more computers similar to computer 500 and programmed as special-purpose machines executing some or all steps of processes described above as executable computer code. Further, processes, modules, and other components described herein may be executed by one or more processing systems similar to that of computer 500.

The computer 500 may include various components that contribute to the function of the device and enable the computer 500 to function in accordance with the techniques discussed herein. As will be appreciated, some components of computer 500 may be provided as internal or integral components of the computer 500 and some components may be provided as external or connectable components. Moreover, FIG. 5 depicts one example of a particular implementation and is intended to illustrate the types of components and functions that may be present in various embodiments of the computer 500.

Computer 500 may include a combination of devices or software that may perform or otherwise provide for the performance of the techniques described herein. For example, computer 500 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 500 may be a unified device providing any one of or a combination of the functionality of a media player, a cellular phone, a personal data organizer, a game console, and so forth. Computer 500 may be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. As shown in the embodiment illustrated in FIG. 5, the computer 500 may include one or more processors (e.g., processors 502a-502n), a memory 504, a display 506, I/O ports 508 a network interface 510, and an interface 512. Additionally, the computer 500 may include or be coupled to I/O devices 514.

In addition, the computer 500 may allow a user to connect to and communicate through a network 516 (e.g., the Internet, a local area network, a wide area network, etc.) and, in some embodiments, to acquire data from a satellite-based positioning system (e.g., GPS). For example, the computer 500 may allow a user to communicate using e-mail, text messaging, instant messaging, or using other forms of electronic communication, and may allow a user to obtain the location of the device from a satellite-based positioning system.

In some embodiments, the display 506 may include a liquid crystal display (LCD) an organic light emitting diode (OLED) display, or other display types. The display 506 may display a user interface (e.g., a graphical user interface) executed by the processor 502 of the computer 500. The display 506 may also display various indicators to provide feedback to a user, such as power status, call status, memory status, network status etc. These indicators may be incorporated in the user interface displayed on the display 506. In some embodiments, the display 506 may include or be provided in conjunction with touch sensitive elements through which a user may interact with the user interface. In such embodiments, a touch-sensitive display may be referred to as a "touch screen" and may also be known as or called a touch-sensitive display system.

The processor 502 may provide the processing capability to execute the operating system, programs, user interface, and other functions of the computer 500. The processor 502 may include one or more processors and may include "general-purpose" microprocessors, special purpose microprocessors, such as application-specific integrated circuits (ASICs), or any combination thereof. In some embodiments, the processor 502 may include one or more reduced instruction set (RISC) processors, such as those implementing the Advanced RISC Machine (ARM) instruction set. Additionally, the processor 502 may include single-core processors and multicore processors and may include graphics processors, video processors, and related chip sets. Accordingly, the computer 500 may be a uni-processor system having one processor (e.g., processor 502a), or a multi-processor system having two or more suitable processors (e.g., 502a-502n). Multiple processors may be employed to provide for parallel or sequential execution of the techniques described herein. Processes, such as logic flows, described herein may be performed by the processor 502 executing one or more computer programs to perform functions by operating on input data and generating corresponding output. The processor 502 may receive instructions and data from a memory (e.g., system memory 504).

The memory 504 (which may include one or more tangible non-transitory computer readable storage mediums) may include volatile memory and non-volatile memory accessible by the processor 502 and other components of the computer 500. The memory 504 may store a variety of information and may be used for a variety of purposes. For example, the memory 504 may store executable computer code, such as the firmware for the computer 500, an operating system for the computer 500, and any other programs or other executable code for providing functions of the computer 500. Such executable computer code may include program instructions 518 executable by a processor (e.g., one or more of processors 502a-502n) to implement one or more embodiments of the present invention. Program instructions 518 may include modules of computer program instructions for implementing one or more techniques described herein. Program instructions 518 may include a computer program (which in certain forms is known as a program, software, software application, script, or code). A computer program may be written in a programming language, including compiled or interpreted languages, or declarative or procedural languages. A computer program may include a unit suitable for use in a computing environment, including a stand-alone program, a module, a component, a subroutine, and the like. A computer program may or may not correspond to a file in a file system. A computer program may be stored in a section of a file that holds other computer programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more processors located locally at one site or distributed across multiple remote sites and interconnected by a communication network. Additionally, the memory 504 may be used for buffering or caching during operation of the computer 500.

As mentioned above, the memory 504 may include volatile memory, such as random access memory (RAM). The memory 504 may also include non-volatile memory, such as ROM, flash memory, a hard drive, other suitable optical, magnetic, or solid-state storage mediums or any combination thereof. The memory 504 may store data files such as media (e.g., music and video files), software (e.g., for implementing functions on computer 500), user preference information, payment transaction information, wireless connection information, contact information (e.g., an address book), and any other suitable data.

The interface 512 may include multiple interfaces and may enable communication between various components of the computer 500, the processor 502, and the memory 504. In some embodiments, the interface 512, the processor 502, memory 504, and one or more other components of the computer 500 may be implemented on a single chip, such as a system-on-a-chip (SOC). In other embodiments, these components, their functionalities, or both may be implemented on separate chips. The interface 512 may coordinate I/O traffic between processors 502a-502n, the memory 504, the network interface 510, 514, or any other devices or a combination thereof. The interface 512 may perform protocol, timing or other data transformations to convert data signals from one component (e.g., the memory 504) into a format suitable for use by another component (e.g., processors 502a-502n). The interface 512 may implement various types of interfaces, such as Peripheral Component Interconnect (PCI) interfaces, the Universal Serial Bus (USB) interfaces, Thunderbolt interfaces, Firewire (IEEE-1394) interfaces, and so on.

The computer 500 may also include an input and output port 508 to enable connection of additional devices, such as I/O devices 514. Embodiments of the present invention may include any number of input and output ports 508, including headphone and headset jacks, universal serial bus (USB) ports, Firewire (IEEE-1394) ports, Thunderbolt ports, and AC and DC power connectors. Further, the computer 500 may use the input and output ports to connect to and send or receive data with any other device, such as other portable computers, personal computers, printers, etc.

The computer 500 depicted in FIG. 5 also includes a network interface 510. The network interface 510 may include a wired network interface card (NIC), a wireless (e.g., radio frequency) network interface card, or combination thereof. The network interface 510 may include known circuitry for receiving and sending signals to and from communications networks, such as an antenna system, an RF transceiver, an amplifier, a tuner, an oscillator, a digital signal processor, a modem, a subscriber identity module (SIM) card, memory, and so forth. The network interface 510 may communicate with networks (e.g., network 516), such as the Internet, an intranet, a cellular telephone network, a wide area network (WAN), a local area network (LAN), a metropolitan area network (MAN), or other devices by wired or wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-MAX, an email protocol (e.g., Internet message access protocol (IMAP) or post office protocol (POP)), message-oriented protocols (e.g., extensible messaging and presence protocol (XMPP), Multimedia Messaging Service (MMS), Short Message Service (SMS), or any other suitable communications standards, protocols, and technologies.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for identifying MAC addresses of a wireless access point, comprising:
    obtaining, via one or more processors, a plurality of media access control (MAC) addresses and a respective plurality of locations associated with each of the plurality of MAC addresses;
    selecting, via one or more processors, a first MAC address associated with a first location and a second MAC address associated with a second location from the plurality of MAC addresses based on a proximity between the first location and the second location, wherein the first MAC address and second MAC address were detected in a single measurement;
    determining, via one or more processors, a signal strength score between the first MAC address and the second MAC address;
    determining, via one or more processors, that the signal strength score is above a signal strength score threshold;
    in response to determining that the signal strength score is above the signal strength score threshold, determining, via one or more processors, a similarity score between the first MAC address and the second MAC address;
    determining, via one or more processors, that the similarity score is above a similarity score threshold; and
    in response to determining that the signal strength score is above the signal strength score threshold, identifying, via one or more processors, the first MAC address and second MAC address as belonging to a single wireless access point.

2. The computer-implemented method of claim 1, comprising:
    associating, by one or more processors, the first MAC address and second MAC address with an index associated with the single AP; and
    storing, by one or more processors, the first MAC address and second MAC address and the index in a data structure.

3. The computer-implemented method of claim 1, wherein the signal strength score is a based in part on the strength of a first wireless signal associated the first MAC address and the strength of a second wireless signal associated with the second MAC address.

4. The computer-implemented method of claim 3, wherein the signal strength score is based in part on a frequency of a detection of the first wireless signal without detection of the second wireless signal.

5. The computer-implemented method of claim 1, wherein determining the similarity score comprises comparing an Organizationally Unique Identifier (OUI) of the first MAC address to an Organizationally Unique Identifier (OUI).

6. The computer-implemented method of claim 1, wherein determining the similarity score comprises:
    determining a difference between a an octet of the first MAC address and an octet of the second MAC address; and
    comparing the difference to a difference threshold.

7. The computer-implemented method of claim 1, wherein obtaining, via one or more processors, a plurality of media access control (MAC) addresses and a respective plurality of locations associated with each of the plurality of MAC addresses comprises accessing a spatial index of the plurality of MAC addresses.

8. The computer-implemented method of claim 1, wherein at least one of the first MAC address or the second MAC address is a virtual MAC address of a virtual AP of the single physical AP.

9. A non-transitory tangible computer-readable storage medium having executable computer code stored thereon for identifying MAC addresses of a wireless access point, the code comprising a set of instructions that causes one or more processors to perform the following:
    obtaining, via one or more processors, a plurality of media access control (MAC) addresses and a respective plurality of locations associated with each of the plurality of MAC addresses;
    selecting, via one or more processors, a first MAC address associated with a first location and a second MAC address associated with a second location from the plurality of MAC addresses based on a proximity between the first location and the second location, wherein the first MAC address and second MAC address were detected in a single measurement;
    determining, via one or more processors, a signal strength score between the first MAC address and the second MAC address;
    determining, via one or more processors, that the signal strength score is above a signal strength score threshold;
    in response to determining that the signal strength score is above the signal strength score threshold, determining, via one or more processors, a similarity score between the first MAC address and the second MAC address;
    determining, via one or more processors, that the similarity score is above a similarity score threshold; and
    in response to determining that the signal strength score is above the signal strength score threshold, identifying, via one or more processors, the first MAC address and second MAC address as belonging to a single wireless access point.

10. The non-transitory tangible computer-readable storage medium of claim 9, the code comprising a set of instructions that causes one or more processors to perform the following:
   associating, by one or more processors, the first MAC address and second MAC address with an index associated with the single AP; and
   storing, by one or more processors, the first MAC address and second MAC address and the index in a data structure.

11. The non-transitory tangible computer-readable storage medium of claim 9, wherein the signal strength score is a based in part on the strength of a first wireless signal associated the first MAC address and the strength of a second wireless signal associated with the second MAC address.

12. The non-transitory tangible computer-readable storage medium of claim 11, wherein the signal strength score is based in part on a frequency of a detection of the first wireless signal without detection of the second wireless signal.

13. The non-transitory tangible computer-readable storage medium of claim 9, wherein determining the similarity score comprises comparing an Organizationally Unique Identifier (OUI) of the first MAC address to an Organizationally Unique Identifier (OUI).

14. The non-transitory tangible computer-readable storage medium of claim 9, wherein determining the similarity score comprises:
   determining a difference between a an octet of the first MAC address and an octet of the second MAC address; and
   comparing the difference to a difference threshold.

15. The non-transitory tangible computer-readable storage medium of claim 9, wherein at least one of the first MAC address or the second MAC address is a virtual MAC address of a virtual AP of the single physical AP.

16. A system for identifying MAC addresses of a wireless access point, the system comprising:
   one or more processors; and
   a non-transitory tangible computer-readable memory having executable computer code stored thereon for identifying MAC addresses of a wireless access point, the code comprising a set of instructions that causes one or more processors to perform the following:
      obtaining, via one or more processors, a plurality of media access control (MAC) addresses and a respective plurality of locations associated with each of the plurality of MAC addresses;
      selecting, via one or more processors, a first MAC address associated with a first location and a second MAC address associated with a second location from the plurality of MAC addresses based on a proximity between the first location and the second location, wherein the first MAC address and second MAC address were detected in a single measurement;
      determining, via one or more processors, a signal strength score between the first MAC address and the second MAC address;
      determining, via one or more processors, that the signal strength score is above a signal strength score threshold;
      in response to determining that the signal strength score is above the signal strength score threshold, determining, via one or more processors, a similarity score between the first MAC address and the second MAC address;
      determining, via one or more processors, that the similarity score is above a similarity score threshold; and
      in response to determining that the signal strength score is above the signal strength score threshold, identifying, via one or more processors, the first MAC address and second MAC address as belonging to a single wireless access point.

17. The system of claim 16, the code comprising a set of instructions that causes one or more processors to perform the following:
   associating, by one or more processors, the first MAC address and second MAC address with an index associated with the single AP; and
   storing, by one or more processors, the first MAC address and second MAC address and the index in a data structure.

18. The system of claim 17, wherein the signal strength score is a based in part on the strength of a first wireless signal associated the first MAC address and the strength of a second wireless signal associated with the second MAC address.

19. The system of claim 18, wherein the signal strength score is based in part on a frequency of a detection of the first wireless signal without detection of the second wireless signal.

20. The system of claim 16, wherein determining the similarity score comprises comparing an Organizationally Unique Identifier (OUI) of the first MAC address to an Organizationally Unique Identifier (OUI).

21. The system of claim 16, wherein determining the similarity score comprises:
   determining a difference between a an octet of the first MAC address and an octet of the second MAC address; and
   comparing the difference to a difference threshold.

22. The system of claim 16, wherein at least one of the first MAC address or the second MAC address is a virtual MAC address of a virtual AP of the single physical AP.

* * * * *